Oct. 9, 1945.    I. L. WOLK    2,386,379

DIOLEFIN RECOVERY

Filed Jan. 28, 1943

INVENTOR.
I.L. WOLK
BY Hudson, Young & Yinger
ATTORNEYS.

Patented Oct. 9, 1945

2,386,379

UNITED STATES PATENT OFFICE 2,386,379

DIOLEFIN RECOVERY

I. Louis Wolk, Bartlesville, Okla., assignor to Phillips Petroleum Company, a corporation of Delaware Application January 28, 1943, Serial No. 473,872

11 Claims. (Cl. 260—681.5)

The present invention relates to an improved method of separating aliphatic conjugated diolefins, especially butadiene, from hydrocarbon mixtures containing the same by means of a cuprous halide, especially cuprous chloride. More particularly, it relates to an improved method of utilizing cuprous chloride as an absorbent for butadiene in which efficient and economical use is made of heating and cooling facilities so as to effect economies in operation and at the same time obtain optimum results.

The principal object of the present invention is to provide an improved method of recovering or concentrating aliphatic conjugated diolefins such as butadiene, isoprene, piperylene, etc., from hydrocarbon mixtures containing the same by absorption by means of a cuprous halide reagent such as cuprous chloride, bromide, or iodide. Another object is to provide such a process especially adapted to use with a solid reagent. Another object is to effect important economies, especially thermal in a process of the foregoing type. Numerous other objects will hereinafter appear.

Figure 1:
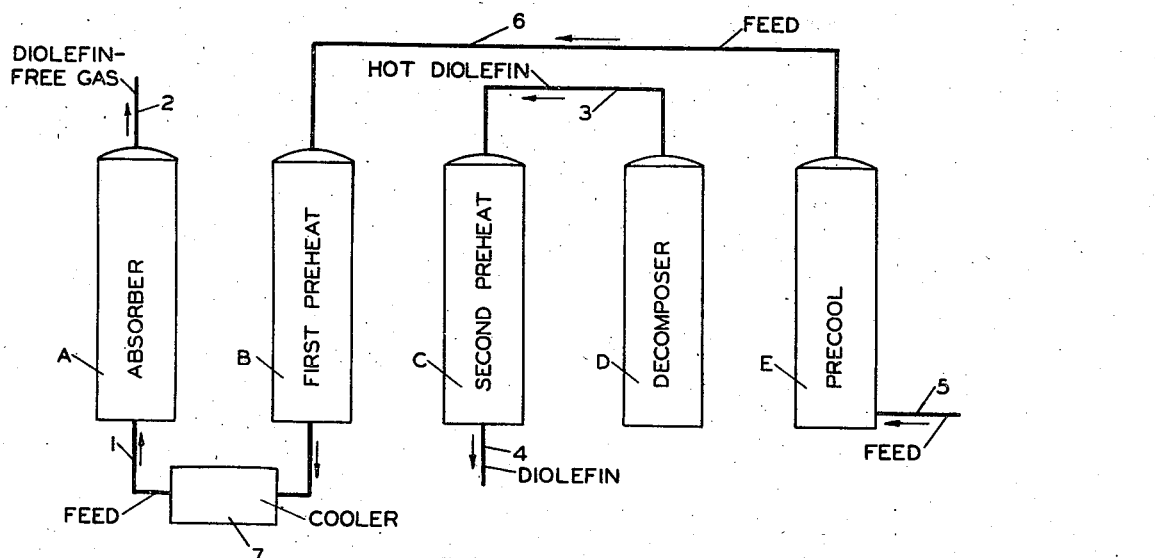
Figure 2:
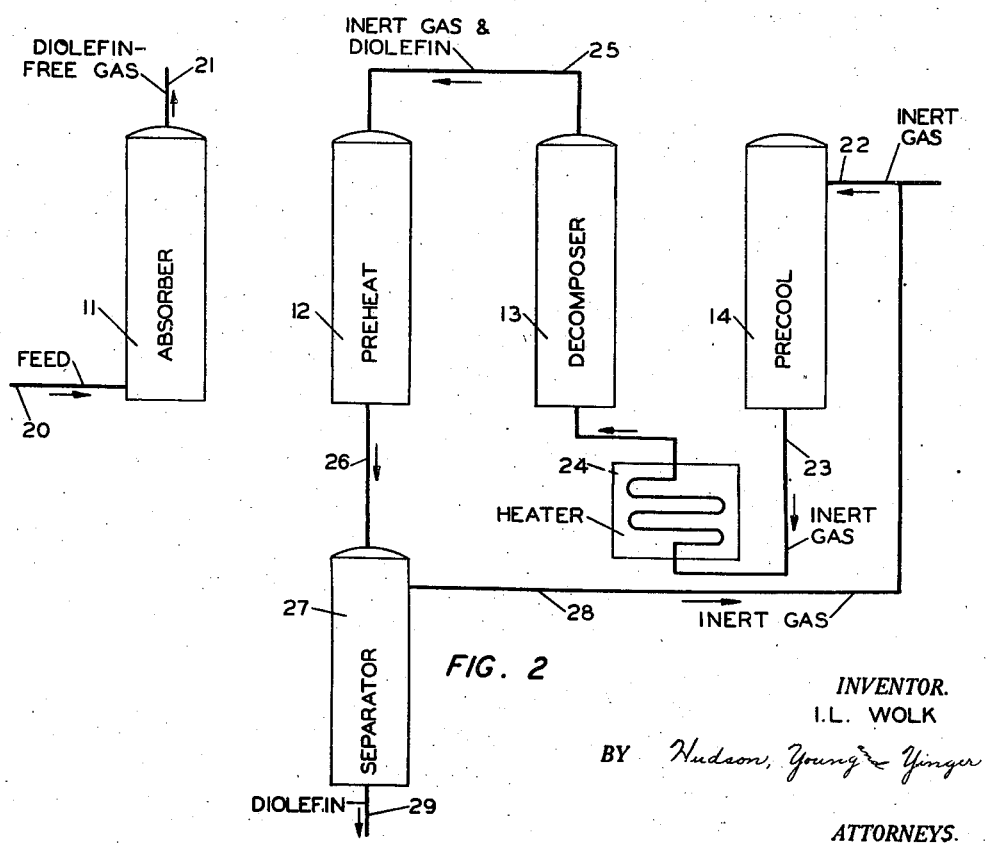

In the drawing, Figures 1 and 2 portray diagrammatically two arrangements of the equipment which may be used to carry out the process of the present invention. In Figure 1 the diolefin containing hydrocarbon feed itself is used as the heat exchange or transfer medium. In Figure 2 an inert gas readily separable from the diolefin is employed as the heat carrier.

My invention involves improvements in the known art of separating aliphatic conjugated diolefins from hydrocarbon mixtures containing the same in which the diolefin-containing mixture is contacted at suitable reaction temperatures with the cuprous halide reagent for a period sufficient to form the cuprous halide-diolefin complex or addition compound after which the complex is heated to effect decomposition thereof and desorption of the diolefin contained therein. My invention preferably and almost invariably is applied with a solid type cuprous halide reagent.

In accordance with my invention the hot cuprous halide-containing reagent, from which the diolefin has been liberated in an immediately preceding step, is contacted with a relatively cool gaseous medium to effect partial cooling of the reagent and simultaneously partial heating of the gaseous medium. A relatively cool body containing the cuprous halide-diolefin complex is then contacted with the resulting partially heated gaseous medium whereby the complex is preheated preliminarily to desorption and said gaseous medium is simultaneously cooled. The thus partially heated complex is then further heated to decomposition temperature to liberate the diolefin combined therein.

Embodiment of Figure 1

In this embodiment, which is a preferred form, the gaseous medium referred to in the preceding paragraph and employed as a heat carrier or transfer medium is the gaseous diolefin-containing hydrocarbon stream itself which is undergoing treatment to recover the diolefin in concentrated form. In most cases this means that the diolefin being recovered is butadiene from a $C_4$ stream, although it may be a $C_5$ or $C_6$ diolefin where such a diolefin or the stream containing same is capable of being maintained in gaseous phase at temperatures below the desorption temperatures. Usually maintenance of $C_5$ or $C_6$ streams in the gaseous form at such temperatures requires either operation under vacuum which is normally deemed impracticable by process engineers or dilution of the stream with a sufficiently large amount of a lower-boiling normally gaseous diluting medium which is readily separable from the $C_5$ or $C_6$ diolefin by fractionation and may be liquefiable such as propane or even $C_4$ hydrocarbon material such as butane or butene, or a butadiene-containing $C_4$ stream or may be an inert non-condensible gas such as nitrogen, methane, etc. The diluent is used in amount sufficient to prevent the condensation or liquefaction of any of the hydrocarbons present under the conditions of temperature and pressure used in the absorption step. This mode of operation is the subject matter of copending application of Schulze, Serial No. 428,774 filed January 29, 1942.

Conveniently, the diolefin liberated in the desorption step is contacted in gaseous form through the preheated reagent preheated in the manner described in the penultimate paragraph to effect further preheating of this reagent toward or to the desorption temperature or even to effect partial desorption thereof in a manner similar to the mode of operation disclosed in copending application of Drennan, Serial No. 353,308 filed August 19, 1940.

In the operation of this embodiment a plurality of reagent zones is provided as shown in the drawing, Figure 1. In the process illustrated, five elongated zones are provided, each of which contains cuprous chloride, either in granular form, or in admixture with or on a solid diluent, carrier or supporting agent such as alumina, sawdust, asbestos, etc. Each of these zones in turn is handled in the manner described below in five cycles. A specific manner of operation in connection with Figure 1 is as follows: An absorption zone A is filled with dry powdered cuprous chloride supported on coarse sawdust which has been treated with heavy mineral oil. A feed mixture containing about 10 volume per cent of butadiene along with other $C_4$ hydrocarbons is passed via line 1 through the absorption zone A at a flow rate corresponding to about two volumes of feed per volume of reagent per minute, the diolefin-free residue gas leaving via line 2. Zone A is conveniently operated at say 50° F. Flow of feed is stopped when the reagent is saturated, substantially all of the cuprous chloride having reacted with butadiene to form the complex $C_4H_6.2CuCl$. Saturated absorption zone A is then heated to desorb the butadiene by heat exchange means or hot inert gases, the body of reagent preferably being heated by suitable heat exchange means; this portion of the cycle is shown at D. When the saturated reagent is heated to about 200° F., the butadiene is liberated and is passed via line 3 through second preheat zone C which is filled with another charge of reagent which has previously been saturated, the diolefin leaving via line 4. This is for the purpose of preheating the reagent in zone C prior to desorption and thus utilizes the heat content of the butadiene, and also cooling of the butadiene prior to storage or further cooling. The hot desorbed reagent is represented by zone E. The feed entering via line 5 is passed through this zone E whereby the reagent is cooled substantially, while the charge is heated, say to about 100° F. The feed is then passed via line 6 through first preheat zone B, where a body of saturated reagent which is at about 50° F. is raised in temperature somewhat, say to about 80° F. The charge is then introduced via line 1 into absorption zone A after passing through a cooler 7 which needs lower the temperature only about 25 or 30° F. to suitable absorption temperature.

In actual operation five reagent zones may be used, as shown each of these being used in the various steps in rotation. This cycle may be described as follows:

While zone A is absorbing, charge is being circulated through hot desorbed zone E to precool same, then through zone B to preheat a previously saturated charge of reagent. At this point the feed should be at or near absorption temperature, but may be brought to this temperature by interposing a suitable heat exchange means 7 following B. It is then passed through absorption zone A. Meanwhile, saturated reagent is being desorbed in zone D by heating to about 200° F., the hot butadiene being passed through zone C to further preheat a charge of saturated reagent initially preheated in zone B. On the next cycle, zone E is cooled further by cooling coils or the like (for example by contact with the cold residue gas leaving zone A by line 2) to about 50° F. and is used as the absorption zone in A position; while zone A goes to B position for preheating, zone B to C position for further preheating, zone C to D position for desorption, and desorbed zone D to E position for precooling as described. Preheat zone C is optional and may be omitted.

*Embodiment of Figure 2*

In this embodiment of my invention, the gaseous medium referred to above as being used as a heat carrier or transfer medium may be an inert gas readily separable from the diolefin. Desirably this is a non-condensible gas such as methane, ethane, hydrogen, nitrogen, propane, etc. In this embodiment the inert gas in relatively cold form is first contacted with a relatively hot desorbed reagent to effect simultaneous precooling of the reagent and preheating of the gas. The preheated gas may then be used, with or without further heating if necessary to bring it to a temperature at which it will effect desorption, to effect desorption of a preheated reagent saturated with diolefin. The hot effluent from the desorption zone and comprising the inert gas and the desorbed diolefin is then contacted with relatively cold saturated reagent to effect preheating thereof preliminarily to desorption temperature. The effluent mixture of inert gas and diolefin is then treated in any suitable known way as partial condensation, fractional distillation, selective absorption, etc., to separate the diolefin from the inert gas which is recycled.

This modification is shown in Figure 2, where inert or non-condensible or other non-reactive and easily separable gas, such as methane, propane, ethane, nitrogen, etc., may be used as a carrier means, and four cycles instead of five are shown. While feed is circulating through absorption zone 11 filled with reagent, the feed entering via line 20 and leaving via line 21, cool inert gas, such as methane, is passed via line 22 through zone 14 filled with hot desorbed reagent, thereby precooling same and preheating the inert gas which leaves via line 23. This gas may be then heated further by heater 24 to temperatures suitable for desorption and passed into decomposition zone 13 filled with preheated saturated reagent. This zone may be heated by heat exchange means to the desired temperature, or the heated inert gas may supply all the heat necessary for desorption or decomposition of the complex. The hot inert gas plus the liberated butadiene is then passed via line 25 through preheating zone 12 which is filled with cool saturated reagent, thus preheating the body of reagent and lowering the temperature of the stream of inert gas plus butadiene. This stream is then passed via line 26 to separation zone 27 where it is treated to separate butadiene as by solvent extraction, compression and liquefaction thereof, etc., the cool inert gas being reused by being recycled via line 28, and the butadiene leaving via line 29. On the next cycle, each of the zones moves one step as described in connection with Figure 1.

*General*

If desired, the saturated reagent may be flushed by passage of a small amount of inert gas therethrough prior to being preheated in order to remove residual charge therefrom and thus permit recovery of butadiene in a state of greater purity. This might be accomplished in Figure 2 for example by by-passing a portion of the preheated gas from zone 14 through zone 12. This gas which entrains a small amount of undesired $C_4$ hydrocarbons may be discarded.

In order to prevent polymerization or oxidation of butadiene, it may be desirable to introduce a small amount of inhibitor, either into the desorption zone, or into the effluent therefrom. On condensation such an inhibitor will remain with the butadiene. Preferably the inhibitor should be one having a substantial vapor pressure at the temperatures of the gas stream so that it will exist in vapor phase until the butadiene is condensed.

In actual operation the reagent may remain stationary in the several zones with gas flow being controlled to each zone in rotation as described by suitable manifolding controlled by either manual or automatic means. Alternatively, the reagent may flow from one zone to the other, the flow of preheating gases being fixed. Thus in Figure 1, the reagent may be conveyed from zone A to B to C to D to E back to A, while in Figure 2 the reagent may flow from zone 1 to 2 to 3 to 4 back to 1. The flow of reagent may be continuous or intermittent.

Other cuprous halides, such as the bromide, or less desirably, the iodide, may be used, and the process is further applicable to the use of any diolefin complex-forming inorganic salt such as those of silver and mercury. It could be broadly applied to separation of unsaturated hydrocarbons by formation of unstable complexes with complex-forming inorganic salts of heavy metals of groups I and II of the periodic system.

I claim:

1. In a process for separating aliphatic conjugated diolefins from hydrocarbon mixtures containing the same which comprises contacting said mixtures with a reagent comprising a salt of a heavy metal of groups I and II of the periodic system which is capable of forming a decomposable complex with said diolefins, at reaction temperatures to permit the formation therein of a metal salt-diolefin complex followed by heating said complex at temperatures sufficient to effect decomposition thereof to liberate the combined diolefin, the steps which comprise contacting hot metal salt reagent from which diolefin has been liberated with a relatively cool gaseous medium to effect partial cooling of said metal salt reagent and partial heating of said gaseous medium, contacting a body of reagent containing the metal salt-diolefin complex with said gas containing the heat imparted to it in the preceding step to cause said gas to impart said heat to said complex, and effecting decomposition of said complex to liberate said diolefin.

2. In a process for separating aliphatic conjugated diolefins from hydrocarbon mixtures containing the same which comprises contacting said mixtures with a cuprous halide at reaction temperatures to permit the formation therein of a cuprous halide-diolefin complex followed by heating said complex at temperatures sufficient to effect decomposition thereof to liberate the combined diolefin, the steps which comprise contacting hot cuprous halide from which diolefin has been liberated with a relatively cool gaseous medium to effect partial cooling of said cuprous halide and partial heating of said gaseous medium, contacting a relatively cool body containing the cuprous halide complex with said partially heated gaseous medium to preheat said complex and cool said gaseous medium, and further heating said preheated complex to decomposition temperature to liberate said diolefin.

3. A process according to claim 2 in which the gaseous medium comprises the diolefin-containing mixture from which diolefin is to be separated.

4. A process according to claim 1 in which the gaseous medium is an inert gas readily separable from diolefin.

5. A process according to claim 2 in which the preheated complex is further heated by contact with diolefin liberated from another portion of decomposed complex.

6. A process according to claim 1 in which a relatively cool inert gas is contacted with hot reagent from which diolefin has been liberated and then contacted with the complex in a decomposing zone, and in which the hot gaseous medium and diolefin flowing from the decomposing zone are contacted with relatively cool complex to preheat same prior to decomposition thereof.

7. A process according to claim 2 in which said diolefin is butadiene and said cuprous halide is cuprous chloride.

8. A process for separating aliphatic conjugated diolefins from hydrocarbon mixtures containing the same which comprises contacting said mixture with cuprous halide at reaction temperatures to permit the formation of a cuprous halide-diolefin complex, heating said complex to decomposition temperatures to decompose same and liberating diolefin, contacting the hot cuprous halide from which diolefin has been liberated with a relatively cool inert gaseous medium whereby said cuprous halide is cooled while said inert medium is heated, contacting said heated inert medium with an additional quantity of cuprous halide-diolefin complex whereby said complex is heated and said inert medium is cooled, and contacting the cooled cuprous halide with additional diolefin containing mixture to form additional complex thereby.

9. A process according to claim 8 in which the cuprous halide is cuprous chloride, and in which the diolefin is butadiene 1,3.

10. A process for the separation of conjugated diolefins from mixtures containing the same which comprises contacting said mixtures with a reagent comprising a cuprous halide at temperatures below those at which decomposition of the complex formed would tend to occur, decomposing said complex at elevated temperatures to liberate diolefin, contacting the hot desorbed reagent with a relatively inert cool gaseous medium to preheat said medium and cool said reagent, contacting said preheated medium with complex at desorption temperatures to desorb diolefin therefrom, contacting the hot gaseous mixture comprising diolefin and inert medium with relatively cold complex to preheat same, separating the diolefin from the inert medium, and returning said inert medium to the system.

11. A process for separating aliphatic conjugated diolefins from mixtures comprising the same which comprises flowing a body of cuprous halide reagent through a reaction zone in contact with said mixtures to effect formation therewith of cuprous halide-diolefin complex, flowing said reagent with complex into a preheating zone into contact with a gaseous medium preheated in the manner hereinafter set forth, flowing said preheated complex into a decomposition zone wherein the diolefin is liberated by decomposition of the complex, flowing the hot diolefin-free reagent into a preheating zone in contact with a gaseous medium to preheat same, and contacting said preheated gaseous medium with cold complex as set forth above.

I. LOUIS WOLK.